US005710883A

United States Patent [19]
Hong et al.

[11] Patent Number: 5,710,883
[45] Date of Patent: Jan. 20, 1998

[54] HYPERTEXT DOCUMENT TRANSPORT MECHANISM FOR FIREWALL-COMPATIBLE DISTRIBUTED WORLD-WIDE WEB PUBLISHING

[75] Inventors: Jack Hong, Palo Alto; George Toye, Foster City, both of Calif.

[73] Assignee: Stanford University, Stanford, Calif.

[21] Appl. No.: 402,470

[22] Filed: Mar. 10, 1995

[51] Int. Cl.⁶ .................................................. G06F 13/00
[52] U.S. Cl. ............................ 395/200.17; 395/200.09
[58] Field of Search ....................... 395/200.01, 200.02, 395/200.03, 200.05, 200.09, 200.17, 200.19, 600

[56] References Cited

U.S. PATENT DOCUMENTS

| | | | |
|---|---|---|---|
| 5,278,955 | 1/1994 | Forte et al. | 395/200.01 |
| 5,530,852 | 6/1996 | Meska, Jr. et al. | 395/610 |
| 5,577,202 | 11/1996 | Padgett | 395/200.18 |
| 5,634,005 | 5/1997 | Matsuo | 395/200.02 |

OTHER PUBLICATIONS

Weber, Jay C. "Part 2: Mail Enabled Applications Using the ServiceMail Toolkit", Presentation Slides from internet site ftp://ftp.eit.com/pub/eit/servicemail/servicem.ppt, Aug. 4, 1994.

Weber, Jay C. and S. Deshpande. "Multimedia on the Internet", Proceedings of Groupware '93, from internet site http://www.eit.com/creations/group93, Aug. 1993.

"The ServiceMail Toolkit" WWW page, from internet site http://www.free.it/FAQs/archive_servers/ServiceMail.html, May 10, 1993.

Hong, J., G. Toye, and L. Leifer. "Using the WWW for a Team-Based Engineering Design Class", Electronic Proceedings of the Second World Wide Web Conference '94, from internet site http://www.ncsa.uiuc.edu/SDG/IT94/Proceedings/Educ/hong/hong.html, Oct. 1994.

Grand, Mark. "MIME Overview" from internet site ftp://ftp.funet.fi/pub/unix/mail/metamail/mime.ps, Jun. 1, 1993.

Weber, Jay C. "and idea for integrating WWW and MIME", electronic mail posting, internet site http://www.eit.com/www.lists/www-talk. 1992/0377.html, Nov. 27, 1992.

"World Wide Web Mailing Lists", World Wide Web Consortium (W3C), internet site http://www/w3.org/pub/WWW/Mail/Lists.html.

"WWW-Talk and WWW-HTML Mail Archives", internet site http://www.eit/com/www.lists/.

Kumar, V., J. Glicksman, and G. Kramer. "A SHAREd Web to Support Design Teams", Proceedings of the Second Workshop on Enabling Technologies Infrastructure for Collaborative Enterprises, IEEE, pp. 178–182, Apr. 1993.

(List continued on next page.)

Primary Examiner—Tod R. Swann
Assistant Examiner—Conley B. King, Jr.
Attorney, Agent, or Firm—Lumen Intellectual Property Services

[57] ABSTRACT

A method is disclosed for publishing a hypertext file set on a world-wide web server machine by packaging the hypertext file set as an e-mail message on a client machine, transporting the e-mail message over the internet from the client machine to the world-wide web server machine, unpacking the e-mail message to recover the hypertext file set, and depositing the hypertext file set into a memory means on the world-wide web server machine. By using the e-mail transport mechanism, a direct internet connection between the client and server is not necessary. Consequently, the method allows files to pass through security firewalls and allows geographically disperse individuals to remotely update information at a WWW site without compromising server security. In addition, processing time is not wasted during direct connections sharing the server's resources and internet bandwidth is not wasted. Finally, because this method uses standard internet protocols and generic server software, the WWW server is not cluttered with client-specific software to handle special protocols and data structures.

11 Claims, 2 Drawing Sheets

OTHER PUBLICATIONS

Toye, G. et al. "SHARE: A Methodology and Environment for Collaborative Product Development", Proceedings of the Third Workshop on Enabling Technologies: Infrastructure for Collaborative Enterprises, IEEE, pp. 33–47, Apr. 1994.

Hong, J., G. Toye, and L. Leifer. "Personal Electronic Notebook with Sharing", Proceedings of the Fourth Workshop on Enabling Technologies: Infrastructure for Collaborative Enterprises, WET ICE '95, IEEE, pp. 88–94, Apr. 1995.

Vacca, J. "Mosaic: Beyond Net Surfing", BYTE, vol. 20, No. 1, pp. 75–86, Jan. 1995.

Vaughan–Nichols, S. "Internet Publishing Tools Proliferate", BYTE, vol. 20, No. 3, p. 30, Mar. 1995.

Abernathy, J. "Here's How to Do Business on the Web", PC World, p. 52, Mar. 1995.

Borenstein, N. "MIME (Multipurpose Internet Mail Extensions) Part One: Mechanisms for Specifying and Describing the Format of Internet Message Bodies", RFC 1521, from internet site ftp://ds.internic.net/rfc 1521.ps, Sep. 1993.

Crocker, David H. "Standard for the Format of ARPA Internet Text Messages", RFC 822, from internet site ftp://ds.internic.net/rfc/rfc822.txt, Aug. 13, 1982.

HYPERTEXT DOCUMENT TRANSPORT MECHANISM FOR FIREWALL-COMPATIBLE DISTRIBUTED WORLD-WIDE WEB PUBLISHING

This invention was made with Government support under the Department of Navy Contract N00014-92-J-1833. The Government has certain rights in the invention.

FIELD OF THE INVENTION

This invention relates to computer information processing and the transmission of information among computer systems. More specifically, it relates to methods for transporting a set of hypertext documents from a client computer system to a server computer system.

BACKGROUND OF THE INVENTION

Recent advances in computer data communications are revolutionizing business, research, education, and entertainment. In particular, the internet, which originally connected computers at U.S. academic and governmental research institutions, has expanded into the private sector to include connections to computers at millions of businesses and homes around the world.

Common methods for communication over the internet include, for example, private e-mail using simple mail transport protocol (SMTP) or unix-unix copy protocol (UUCP), remote connections to distant computers directly via telnet or the file transfer protocol (FTP), and browsing the world-wide web (WWW) using hypertext transfer protocol (HTTP). Browsing the WWW is by far the easiest and most popular way for a novice to explore the information and resources available on the internet.

Programs called browsers use HTTP to retrieve and display hypertext files from other computers on the internet. A hypertext file is typically a text file written in hypertext mark-up language (HTML), which marks up the text with special commands that control its formatting and link it with other hypertext files. One hypertext file can contain links to other hypertext files anywhere on the internet. These files can, in turn, contain links to other files, thus creating a "world-wide web" of hypertext files. Moreover, in addition to text files, these files can contain graphics, sound, and interactive capabilities. Because the HTML commands are hidden from view when the file is displayed, the browser allows the user to jump between text, graphic, and sound files from all over the world at the click of a button and without needing to read or provide specific links to internet HTTP addresses.

Because the WWW is so vast and so easy to browse, many organizations, individuals, and businesses are naturally interested in making their own set of hypertext files available for browsing by others on the world-wide web. Although WWW browsers make it very easy for novices to read hypertext files on the internet, writing their own hypertext files and making them available to others on the WWW is presently too difficult for novices. Even for a person proficient with computer languages and systems, the task of converting a set of files to HTML, and installing them on an HTTP server is time-consuming.

A set of files can be prepared off-line on a client machine and transferred to the WWW server machine, or can be prepared directly on the WWW server. Off-line authoring involves the steps of embedding HTML into the files, previewing them with a local browser to verify the intended formatting and hypertext references, connecting to an HTTP server machine on the internet, moving to the appropriate directory, and transferring the hypertext files to the server. This procedure requires familiarity with Unix®, HTML, and FTP and is consequently beyond the skill of a novice. Moreover, even for a person proficient in the art, it is impractical to update files with this time-consuming and laborious procedure. Finally, since each file is transferred separately, this method also makes inefficient use of internet bandwidth. Although on-line authoring eliminates many steps in connecting to the WWW server and transferring the files, this process is still time-consuming and error-prone for a novice. Moreover, it has the great disadvantage that users without a direct network connection to the WWW server machine can not remotely manage their files. In short, present methods of WWW publishing are inefficient, difficult to install and maintain, and are limited to institutions and individuals with the requisite time and expertise.

An important difficulty with present methods of off-line WWW publishing is maintaining the security of the WWW server machine. Since the transfer and modification of HTML files presently requires a direct internet connection between the client machine and the WWW server machine, the server becomes vulnerable to break-in by unauthorized users. Constructing a server security firewall, on the other hand, eliminates direct internet connections and thus presently precludes remote off-line WWW publication. Restricting publication to users on the server's local area network, however, severely limits the potential applications of WWW publishing. Indeed, since the great power of the internet resides precisely in its ability to quickly transfer information between geographically dispersed individuals, this restriction essentially defeats the whole purpose of the internet. For example, one of the most promising applications of WWW publishing is for sharing collaborative work among geographically dispersed members of a company, committee, organization, or research group. Using present methods, however, this application requires each member to remotely connect to the server machine; therefore, it can not presently be implemented using a server with a security firewall.

Several software products have appeared that are designed to facilitate the procedure of WWW publishing. A whole class of products are the HTML conversion programs. These programs are designed to automatically convert files having various specific formats into HTML files, thereby dramatically simplifying the laborious task of embedding HTML into files. Since they are automatic, however, the HTML files usually require additional HTML editing in order to correct erroneous conversions. Therefore, these programs do not eliminate the need to know HTML. Moreover, they only simplify one step of the complicated process of WWW publishing. In short, although they do make the job considerably easier for the expert, they do not simplify it enough to make it accessible to the novice.

Another product designed to facilitate WWW publishing is InterNotes™ Web Publisher, by Lotus. This product is a software program that transports Lotus Notes® documents from a client machine to a custom server machine and translates them into HTML documents for WWW publication. Although this program enables the novice to publish files on the WWW without any knowledge of HTML, FTP, or UNIX®, it has several significant drawbacks. The most important drawback is that this method requires a direct connection to the server machine and does not, therefore, allow geographically dispersed authoring to be combined with server security firewalls. Requiring a direct connection to the server machine can also be inconvenient and inefficient. If too many people attempt to connect to the server at once, some will be refused connection or, if they are all permitted to connect, the response time of the server will be very slow. Other important drawbacks of InterNotes are that the server must be provided with expensive and client-specific server software, the client must be provided with customized client software, and the user is restricted to authoring documents with Lotus Notes®. Implementing this publishing method is therefore inefficient, restrictive, expensive, and does not permit the combination of server security with distributed publishing.

OBJECTS AND ADVANTAGES OF THE INVENTION

In view of the above, it is a primary object of the present invention to provide a method for conveniently and efficiently transporting a set of structured hypertext files over the internet from a client to a WWW server having a security firewall. It is a further object of the invention to provide a method for allowing geographically dispersed individuals to easily update hypertext documents on a remote WWW server without compromising the server's security. It is an additional object of the invention to implement such a method without introducing client-specific modifications to the existing software on WWW server machines. It is another object of the invention to allow novices to create and maintain a set of interrelated hypertext files on a portable client machine and to easily update the appropriate files on a WWW server machine without requiring a direct connection to the server. Further objects and advantages of the invention will be readily apparent from an examination of the following description and drawings.

SUMMARY OF THE INVENTION

The disclosed method for publishing a hypertext file set on a world-wide web server machine is performed by packaging the hypertext file set as an e-mail message on a client machine, transporting the e-mail message over the internet from the client machine to the world-wide web server machine, unpacking the e-mail message to recover the original hypertext file set, and depositing the hypertext file set into a memory means on the world-wide web server machine. If only some of a complete hypertext file set has been modified, then only the subset of modified hypertext files are packed into the e-mail message and transported.

The hypertext file set is packaged as an e-mail message by embedding HTML commands into the hypertext file set, creating a composite e-mail message containing both the content of the hypertext file set and a corresponding set of hypertext file path names reflecting the structure of the hypertext file set, and adding a mail header to the composite e-mail message containing mail control switches identifying the message as a hypertext file set.

The packaged e-mail message is then transported from a client machine to a WWW server machine over the internet via one or more e-mail transport agents. This transportation comprises the steps of transmitting the message over an e-mail connection from a mail processing agent on the client to an internet e-mail transport agent, and transmitting the message over an e-mail connection from the internet e-mail transport agent to a mail processing agent residing on the WWW server. Additional e-mail transport agents may be included as intermediaries.

After the e-mail message arrives, the WWW server unpacks it by first examining the mail control switches in the mail header which identify it as a hypertext document set, and then decomposing the e-mail message into the original hypertext file set and a corresponding set of hypertext file path names. The contents of the hypertext file set are then deposited in the appropriate directories on the WWW server's memory means according to the structure determined by the set of hypertext file path names. Each of the hypertext files can be any type of file relating to WWW browsing, such as text files, graphics files, sound files, database files, access control files, and program files.

In a preferred embodiment, the client machine is a portable computer and the method includes editing the hypertext file set on the portable computer.

DETAILED DESCRIPTION

Figure 1:
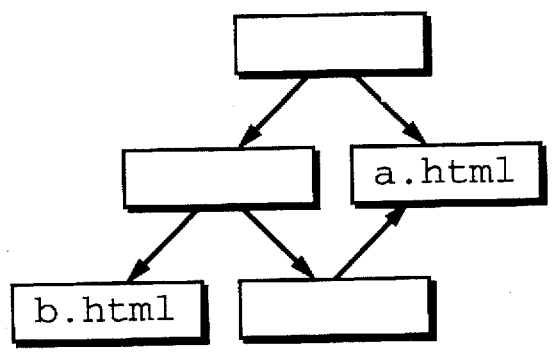
FIG. 1 is a schematic diagram of a correctional hypertext file set indicating the links between files.

FIG. 1 shows a typical hypertext file set, or notebook, consisting of five text files, or notes, with links between them. In a preferred embodiment, this hypertext file set is created and edited by a personal electronic notebook program running on a client machine such as a portable Macintosh® computer. This program allows novices to easily create and edit the contents and structure of the notebook. Since the client machine is portable and easy to use, it provides a convenient tool for keeping track of structured information. Natural applications include research and design notes, business data and correspondence, and academic papers and reviews. The program supports quick data entry and browsing between notes. On a single 640×480 pixel screen, the user is able to see not only a note, but titles of adjacent notes, and the top-level category under which that note is classified. Shifting between categories is accomplished via a mouse click or the left and right arrow keys. The up and down arrow keys cycle through notes within a single category. Automatic time stamping is provided for a sense of history.

Upon returning to the office, home, or any other place with a connection to the Internet (e.g., via AppleTalk® or modem), both the contents and structure of the notebook can be transmitted to a world-wide web server machine and woven into a larger collaborative hypertext file set containing many individual file sets relating to a common project. This allows anyone to view the entire collaborative notebook via any WWW-browser anywhere on the internet. This system, therefore, permits geographically dispersed group members, who have no computer expertise, to easily share a full network of documents and their semantic relationships with each other and with the rest of the world. The applications, therefore, include not only personal research and organization, but many other types of collaborative work as well. If it is desirable to restrict viewing of all or some of the files to a selected group of people, this is accomplished by transmitting the appropriate access control information along with the hypertext file set.

Figure 2:
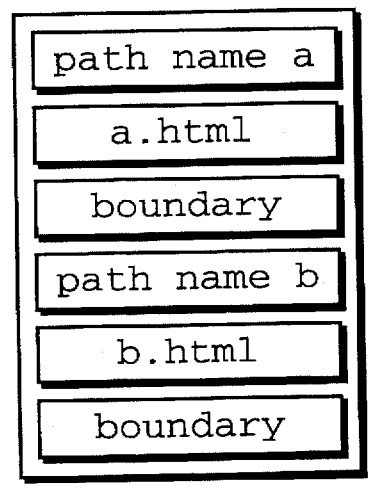
FIG. 2 is a schematic diagram of a Multi-purpose Internet Mail Extensions (MIME) message containing the contents of two hypertext files and their respective path names, according to the invention.
Figure 3:
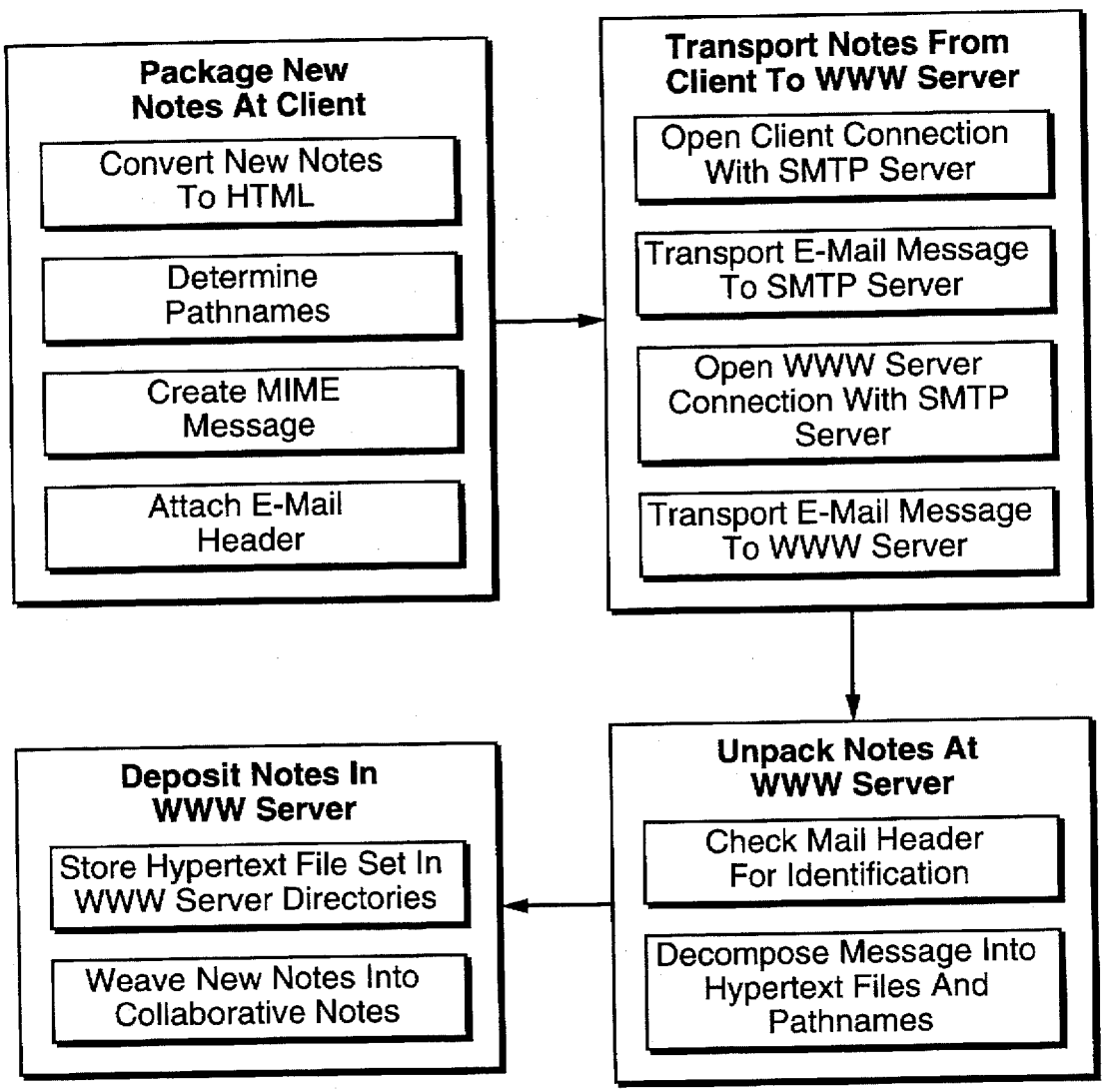
FIG. 3 is a flowchart detailing the method for transporting the hypertext file set from the client to the WWW server, according to the invention.

The detailed method for transmitting a notebook over the internet is shown in FIG. 3. First, the client program looks only at notes which have been modified since the last posting. For example, in the notebook of FIG. 1, only notes a.html and b.html have been modified. The program then converts each new note into a formal HTML document, and creates a list of path names which encodes directory depositing information for the new notes. The HTML documents and path names are then concatenated into a single e-mail message using a composite mail messaging scheme, as detailed in FIG. 2. In a preferred embodiment, the MIME (Multipurpose Internet Mail Extensions) scheme is used, and master index files for the notebook are automatically created and packaged into this same MIME message. An e-mail header is attached to the message to direct it to a preset mail account on the WWW server. The header also contains special identification tags in the subject field.

To transport the e-mail message from the client to the WWW server, the client program, now acting as a mail processing agent, first opens an e-mail connection with an internet e-mail transport agent. In the preferred embodiment, the e-mail connection is a standard transmission control protocol/internet protocol (TCP/IP) connection and the internet e-mail transport agent is an SMTP (Simple Mail Transport Protocol) server. The message is then sent to the SMTP server, thereafter traveling through the internet to the WWW server as any other e-mail message would.

The methods necessary for implementing such a client program on a conventional portable computer are well-known in the art. In a preferred embodiment, this client software is a custom HyperCard® stack with embedded TCP/IP code for handling file transmission.

After traveling through the internet between one or more e-mail transport agents, the message arrives at an e-mail transport agent which opens an e-mail connection with the WWW server. In a preferred embodiment, the e-mail transport agent is an SMTP server and the connection is a TCP/IP connection. The e-mail message is then sent to a mail processing agent on the WWW server, which acts on e-mail directed to the destination mail account. This mail processing agent automatically handles incoming mail using ServiceMail™ with custom TCL (Tool Command Language) programming scripts which decompose the MIME message into its original parts and deposits the files in the appropriate directories. ServiceMail looks at the subject header of the mail message, and determines (upon acceptance) where to deposit the set of files. After separating and depositing these files, it launches a post-processing program which "weaves" the new index into the existing group index. If the user had so requested, a mail message would then be sent back to the author, notifying completion of the depositing process.

User authentication is handled by a custom group, login and password scheme which does not require individual Unix accounts to be created on the WWW server machine. This information allows the server code to determine where to deposit hypertext files on the WWW server, so that distinct personal and group spaces are maintained.

The methods necessary for implementing such a server program on a conventional WWW server machine are well-known in the art.

In conclusion, the disclosed method for WWW publishing allows novices to easily create and edit hypertext files off-line on a client machine and transport them over the internet to a separate WWW server with security firewalls. There is no need to know HTML, Unix, FTP, or any other specialized languages or protocols. Even for experts, the method provides a quick and efficient tool for establishing and maintaining WWW sites off-line. More importantly, however, by encapsulating the hypertext file set in a MIME message and using the SMTP transport mechanism, this method allows updates to pass through security firewalls. Consequently, it allows geographically disperse individuals to remotely update information at a WWW site without compromising server security. In addition, since the e-mail transport mechanism does not require a direct connection between the client and server machines, network traffic and server processing resources are minimized. Moreover, the transmission of a single e-mail message is far more efficient than separately transmitting the files individually using a direct connection, thus precious internet bandwidth is not wasted. Finally, because this method uses standard internet protocols and generic server software, the WWW server is not cluttered with client-specific software to handle special protocols and data structures.

Although the above description contains many specifics, it is intended merely as one illustration of how the disclosed method may be implemented. Many variations are possible. For example, the client machine does not need to be a portable computer, but could be any other computer separate from the WWW server, such as a home computer or network connected workstation. The notes need not be packaged in a MIME message with the specific structure described, but may be packaged using other formats and structures to achieve the same effect. The transport mechanism need not use SMTP, but could use other standard e-mail transmission methods such as UUCP, FidoNet, AOL, and MCIMail®, to name a few. Accordingly, the scope of the invention should not be determined by the details of the above description, but by the following claims and their legal equivalents.

We claim:

1. A method for publishing a hypertext file set on a world-wide web server machine, the method comprising:

packaging the hypertext file set as a composite e-mail message on a client machine, transporting the composite e-mail message over the internet from the client machine to the world-wide web server machine, unpacking the composite e-mail message to recover the hypertext file set, and depositing the hypertext file set into a memory means on the world-wide web server machine.

2. The method of claim 1 wherein the hypertext file set is a subset of a complete hypertext file set, the subset consisting of modified hypertext files.

3. The method of claim 1 wherein the packaging step comprises:

embedding hypertext mark-up language commands into the hypertext file set, creating a composite e-mail message containing both the content of the hypertext file set and a corresponding set of hypertext file path names reflecting the structure of the hypertext file set, and adding to the composite e-mail message a mail header containing mail control switches identifying the e-mail message as a hypertext file set.

4. The method of claim 1 wherein the transporting step comprises:

transmitting the composite e-mail message over an e-mail connection between a mail processing agent residing on the client machine and an internet e-mail transport agent, transmitting the composite e-mail message over an e-mail connection between the internet e-mail transport agent and a mail processing agent residing on the world-wide web server machine.

5. The method of claim 1 wherein the transporting step comprises:

transmitting the composite e-mail message over an e-mail connection between a mail processing agent residing on the client machine and a first internet e-mail transport agent, transmitting the composite e-mail message over the internet from the first internet e-mail transport agent to a second internet e-mail transport agent transmitting the composite e-mail message over an e-mail connection between the second internet e-mail transport agent and a mail processing agent residing on the world-wide web server machine.

6. The method of claim 1 wherein the unpacking step comprises:

identifying the composite e-mail message as containing a hypertext document set by examining mail control switches in a mail header, and decomposing the composite e-mail message into the hypertext file set and a corresponding set of hypertext file path names.

7. The method of claim 1 wherein the depositing step comprises storing the contents of the hypertext file set in the memory means according to a structure determined by a corresponding set of hypertext file path names.

8. The method of claim 1 wherein the hypertext file set comprises a file type selected from the group consisting of text, graphics, sound, database, program, and access control.

9. The method of claim 1 further comprising editing the hypertext file set on the client machine.

10. The method of claim 1 further comprising post-processing the hypertext file set to weave it into a collaborative hypertext file set including a group index file.

11. The method of claim 1 wherein the client machine is a portable computer.

* * * * *